Nov. 28, 1933.  W. SHURTLEFF  1,937,483
METHOD AND APPARATUS FOR PURIFYING AND DIFFUSING AIR
Filed March 26, 1931  2 Sheets-Sheet 1
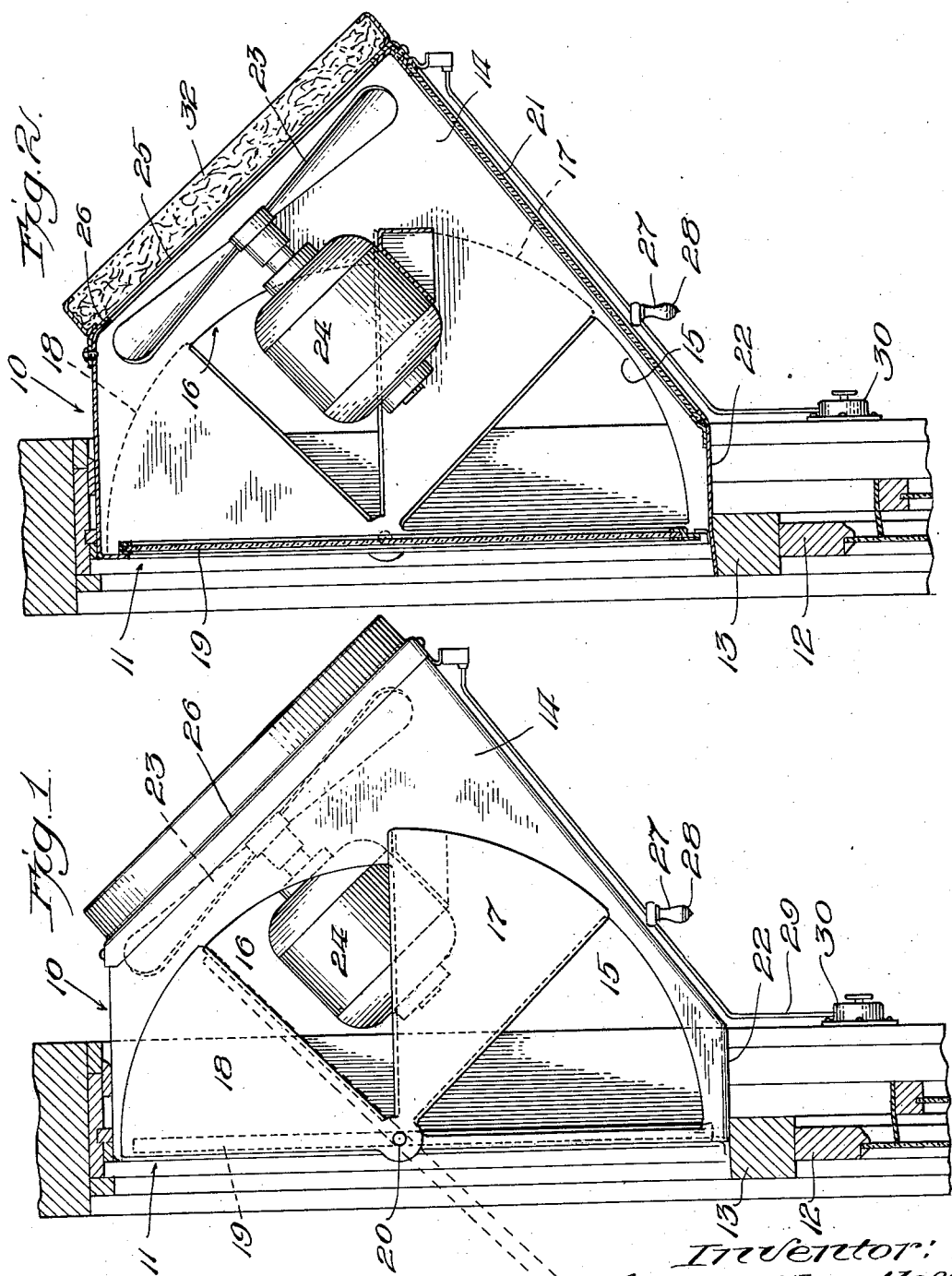
Inventor:
Wilfred Shurtleff.
by George I. Haight
Atty.

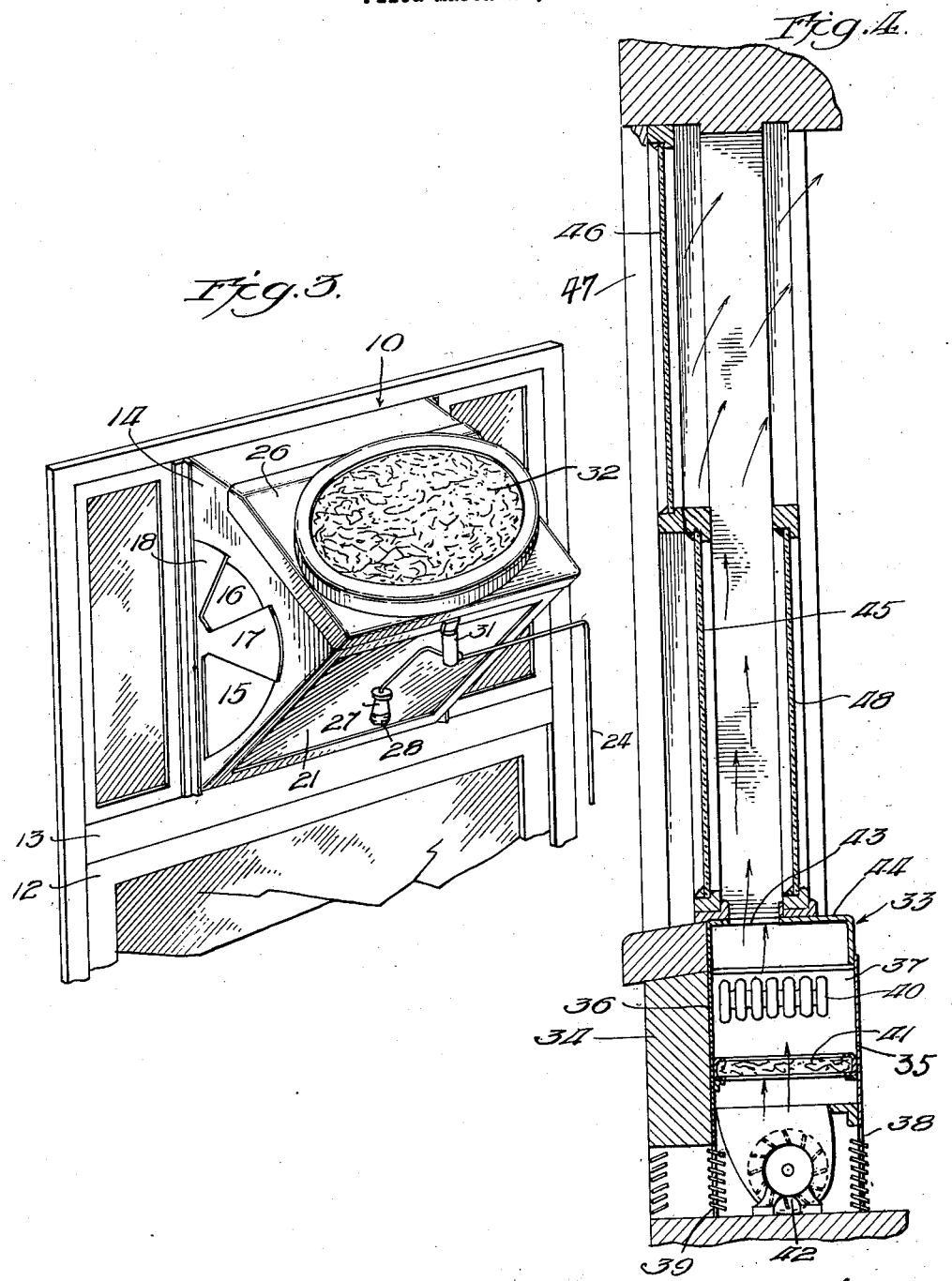

Patented Nov. 28, 1933

1,937,483

UNITED STATES PATENT OFFICE 1,937,483

METHOD AND APPARATUS FOR PURIFYING AND DIFFUSING AIR

Wilfred Shurtleff, Moline, Ill., assignor to The Herman Nelson Corporation, Moline, Ill., a corporation of Illinois Application March 26, 1931. Serial No. 525,371

16 Claims. (Cl. 98—94)

This invention relates to method and apparatus for purifying and diffusing air.

It has long been known that outdoor sunlight is beneficial to the human system, by reason of the fact that the actinic rays of the sun possess certain properties which tend to the destruction of germs and purify the air and render it better fitted for breathing.

It is also known that ordinary window glass, although transparent to visible rays, acts as a barrier against the passage of the beneficial actinic rays comprising the ultra-violet and infrared rays of the spectrum, and which, for the purposes of the present invention, will be referred to as the biologic rays of the sun. It is also known that certain varieties of glass, including quartz glass and the so-called Vitaglass, possess the property of permitting the passage of such biologic rays, although even these substances will impede the passage to a considerable extent. However, it has been found by experimentation that a substantial percentage of the biologic sun rays will pass through these special glasses and travel for a distance of three or four feet to the interior of a room, although it appears that the impediment afforded results in a weakening effect to such an extent that biologic rays will not pass inwardly to the center of a room, so that in solariums or other places provided with quartz glass or Vitaglass, the beneficial effects of exposures to sunlight can only be secured by remaining in close proximity to the window through which the rays of sunlight are admitted.

In view of the health giving properties of the biologic sun rays, attempts have heretofore been made to produce these rays artificially, but it has been found that besides the true sun ray type of ultra-violet and infra-red rays which possess biologic value, other short ultra-violet rays are also produced which are not beneficial except to destroy germs and bacteria, and are otherwise harmful in their effect on the eyes and to the life processes of the human body, if permitted to directly impinge thereon.

While air undergoing the beneficial effects of violet ray and infra-red sun rays is freely available to persons out of doors, the limitations in the penetration of such rays, even within solariums or other rooms provided with special forms of glass which are transparent to the biologic rays, renders it desirable to provide means whereby the purifying and stimulating properties of the biologic rays may be made available to a large extent to those housed within doors, and in locations which are not subject to their direct action.

The present invention is directed to an apparatus so constructed as to periodically subject every portion of the volume of air contained within a room to the direct action of biologic rays admitted through what may be termed biologically transparent glass, and thereafter disseminated throughout the room and recirculated, so that germ laden dust particles or the like will be brought within the range of action of the biologic rays and thereby rendered innocuous to the occupants of the room.

It has also been found that the action of the biologic rays upon the air imparts to it certain purifying and invigorating properties, which will be retained in greater or less degree as the air is thereafter recirculated through the room, so that by subjecting the air recurrently to this action, the atmospheric conditions within the entire room will be improved and the occupants will obtain in considerable measure the beneficial effects of direct contact by the biologic sun rays, even though distantly located within the room and outside of the range of direct sunlight.

The method in question consists of the use of a fan or blower so located with respect to the biologically transparent glass window that it will constantly maintain a current of air from the room past the window and back into the room again, so that germ laden dust particles will be temporarily subjected to the direct action of the biologic rays while within the range of travel of such rays beyond the biologic window, and while subjected to the swirling or agitating effect of the air currents, so that germs will be destroyed or rendered innocuous and at the same time the air will be otherwise purified preparatory to its recirculation into distant portions of the room.

At the same time, the apparatus provides for the maintenance of proper temperatures by making provision for the admission of outdoor air in regulated quantities for admixture with the recirculated indoor air when the temperature of the room rises to a point requiring the cooling effect of outdoor air, and the blower mechanism employed maintains the indoor air constantly in circulation at all times, which greatly promotes the comfort of the occupants and provides for the dissemination of body heat with the cooling and beneficial effects of a constantly moving air current of vertical or eddy form, which secures the beneficial effect of moving air currents without creating drafts or other uncomfortable air currents.

In the drawings illustrating the invention,—

Figure 1 is a side elevation of one form of apparatus adapted to operate in conformity with the principles of the present invention, and set into the space occupied by the upper sash of an ordinary window;

Fig. 2 is a vertical sectional elevation of the device of Fig. 1, showing the interior arrangement;

Fig. 3 is a perspective view of the same; and

Fig. 4 is a sectional elevation of a modified form of apparatus embodying a heating and ventilating unit of well known type, so arranged as to purify the discharged air in conformity with the principles of the present invention.

The apparatus of Figures 1, 2 and 3 is in the form of a boxlike cabinet or housing 10, set obliquely within the upper sash opening 11 of an ordinary sash window, so located as preferably to secure full exposure to the sun's rays. As shown, the upper sash 12 of the window is lowered, and above the sash there is located a cross bar 13 upon which the cabinet 10 rests.

The cabinet comprises side walls 14 of generally triangular configuration, and each of the side walls is provided with a lower recirculation segmental opening 15 and an upper recirculation segmental opening 16. The lower recirculation openings on opposite sides of the cabinet occupy positions closely adjacent to the window sash 11, while the upper recirculation openings 16 on either side stand inwardly to a greater extent.

The lower openings 15 are controlled by segmental dampers 17, and the upper openings are controlled by means of segmental dampers 18, so that, by proper adjustments, the dampers can be swung to the proper positions to open or close the respective recirculation openings either wholly or partially, as desired.

The front of the cabinet or housing which rests within the sash opening is closed by a biologic window or outside damper 19, which is centrally mounted on a horizontal pintle 20 and is adapted to swing from the vertical closed position indicated in full lines in Fig. 1 to the obliquely disposed open position indicated in dotted lines, but in either position the biologic window will admit the biologic rays of the sun to the interior of the cabinet, being paned with a pane of Vita-glass or other glass or medium which is transparent to the biologic sun rays. In this way, and irrespective of the adjustment of the biologic window, the air within the interior of the cabinet will at all times, when the sun is shining in the proper direction, be subjected to the direct influence of the biologic sun rays, in view of the fact that the range of travel of said rays will be sufficient to reach all portions of the interior of the cabinet.

The lower side of the inwardly projecting portion of the cabinet is afforded by an obliquely disposed panel 21 of biologic glass, which constitutes a window for admitting light and the direct rays of the sun to the interior of the room, so that the presence of the cabinet will not in any substantial degree interfere with the illumination of the interior of the room.

The forward portion of the cabinet is in the form of a rectangular apron 22 of a width and height to permit it to fit snugly within the confines of the upper sash window opening, and the cabinet as a whole is preferably constructed of sheet metal of sufficient thickness and rigidity to maintain its shape and support its weight by engagement of its forward portion within the confines of the window opening.

In order to maintain a circulation of air through the cabinet or housing, a fan 23 is provided, which is driven by a motor 24. The fan and motor are obliquely disposed to bring the plane of the fan into register with a circular opening 25 formed in the center of an obliquely disposed wall 26 which constitutes the upper face of the inwardly projecting portion of the cabinet, which stands at substantially a 90° angle to the biologic window panel 21.

The position of the dampers 17 and 18 and of the biologic outer window 19 can be regulated either by hand or be thermostatically controlled, but, as shown, both the segmental dampers and the window are fixedly mounted upon a pintle 20 and movable therewith, so that rotation of the pintle will move both the dampers and the window in unison, to the desired degree, thereby concurrently closing the recirculation openings as the window is opened, in greater or less degree, to admit outside air and restrict the admission of indoor air.

If desired, the cabinet may also be provided with an artificial source of illumination for use principally in cloudy weather, or when the sun's rays are not directed into the cabinet. Such artificial source of illumination, as shown, is in the form of an ultra-violet sun ray lamp 27, which is located below and in close proximity to the inner window 21, which lamp is shielded on its under side by a metal shield 28 in the form of an oxidized cap adapted to protect the eyes and reflect the ultra-violet rays upwardly through the biologic glass window and into the interior of the cabinet.

Both the motor and lamp are energized through circuit wires 29 controlled by a master switch 30. The circuit leading through the lamp includes a thermostat 31 which is disposed in close proximity to the inner biologic window and in position to receive the direct rays of the sun, and the thermostat may be set to operate at any desired temperature for the purpose of closing the lamp circuit when the heating effect of the sun diminishes to a predetermined degree, and to open the circuit when the sun's rays are sufficiently powerful to afford the necessary radiant effect within the cabinet without the assistance of the lamp.

The lamp circuit and the motor circuit are both arranged in parallel, so that a turning on of the master control switch 30 will immediately start the fan motor, without, however, illuminating the lamp unless the thermostat is also conditioned to close the lamp circuit.

If desired, also, the cabinet can be extended beyond the outer face of the fan, as indicated in Fig. 2, to provide for the support of a removable filter 32, the use of which, however, is optional and dependent upon the condition of the air in the locality.

The above apparatus is adaptable for use under conditions where it is not necessary to make special provision for the heating of the air within the room, or where ordinary heating appliances are employed, but similar results can be attained in cases where a unit heater and ventilator is employed in the manner indicated in Fig. 4.

In this case, the unit heater and ventilator 33 is set in close proximity to a window and immediately below the window sill and in adjacent relation to the outer wall 34 of the building.

The unit comprises a boxlike housing having a front wall 35, a rear wall 36, and end walls 37. Recirculated air is admitted from the interior of the room through a damper controlled opening 38 near the base of the front wall, and fresh air is admitted through a damper controlled opening 39 near the base of the rear wall. Provision may be made for the damper control of the inlets in coordinated relation to one another, if desired, but it is not deemed necessary to show such mechanisms in detail.

Within the cabinet is located a radiator 40 of light weight construction, and below the radiator a filter 41 may be located, if desired. A fan 42 located near the base of the cabinet serves to suck in either indoor air or outdoor air, or a mixture of the two, and discharge the same upwardly through the radiator and through a discharge opening 43 in the rear portion of the top wall 44 of the cabinet.

In the present instance, a biologic window comprising a lower sash 45 and an upper sash 46, each glassed with biologic glass, is provided, and immediately in front of the lower sash and in spaced relation thereto, and within the confines of the window opening 47, is located an inner screen or panel 48, which is preferably of glass for illuminating purposes, and may be of biologic glass, although in many cases ordinary glass may be employed.

The arrangement is such that a relatively broad shallow channel or conduit is provided, through which the entire outflow from the cabinet heater is discharged in the form of a broad sheet or current of air, which is maintained in close relation to the biologic glass window provided by the lower sash in the arrangement shown, and this broad current sheet of air, after traversing the area provided by the lower sash and within the confinement afforded between the lower sash and the inner screen or panel 48, will be directed upwardly and in close proximity to the upper biologic sash, so that the current flow of the air will be subjected to the biologic sun rays throughout its entire path of travel past the window and until it reaches the upper level of the window, at which time it will begin to circulate inwardly and away from the range of the biologic rays.

The arrangement, however, is one which subjects all of the air outflow from the cabinet to the biologic rays throughout a considerable period of time and under conditions which will cause a surging and vertical movement of the air currents within the region of confinement, so that dust particles or the like upon which germs may be harbored will be turned over and over and repeatedly exposed to the purifying and germicidal effect of the biologic rays and within a region well within the range of penetration of the rays, so that the purifying and energizing effect of the rays will be imparted to the air prior to its recirculation throughout the more distant regions within the room.

The apparatus of Fig. 4 is peculiarly adapted for use in connection with present installations of heating and ventilating units, which are almost invariably located immediately beneath a window sill, so that the special features of the present invention can be readily applied in connection with such installations by merely installing biologic glass in lieu of the ordinary glass in the lower and upper sash frames, and by providing a screen or panel, preferably of glass, in parallel relation to the lower sash to afford the necessary channel for confining the upwardly directed air current within the region closely adjacent to the exterior biologic glass for a sufficiently prolonged period of time to provide opportunity for securing the beneficial effects of exposure to biologic sun rays.

Although for purposes of illustration two forms of apparatus have been shown, which are designed to afford means for inducing a current flow of air into close proximity to a biologic window exposed to the direct rays of the sun, and of providing the necessary confinement for the air currents within this region to secure the radiant effects desired, it will be understood that other forms of apparatus designed to secure a similar result may be employed, and that the present invention is directed to any suitable form of apparatus adequate to the purpose and to the method of purifying and energizing the air in the manner stated, and redistributing it throughout more distant portions of the room in the manner heretofore described.

It will be further understood that although I have referred in particular to the germicidal effects of the biologic sun rays in purifying the air, I also have in mind other beneficial effects attendant upon the exposure of a current of air to the direct influence of the biologic rays, whether the same be due to purifying or energizing effects in a manner not yet clearly understood, but which are known to occur as a result of exposure to sunlight, and even in some degree to the light reflected from the sky when the direct rays of the sun are not available, so that in the claims, where I use the expression sunlight, I intend to include in that expression either the direct rays of the sun or the reflected rays included under the expression daylight.

I claim:

1. In an apparatus of the class described, the combination of a housing provided with an inlet for room air and provided with a discharge outlet to the room, a fan within the housing for inducing an air current flow through the housing and into the room, and a biologic window constituting the outer wall of the housing and adapted to admit biologic rays to the interior of the housing to act upon currents of air flowing through the housing and discharging into the room, the housing being provided on its inner side fronting the room with a transparent window to admit light to the room.

2. In an apparatus of the class described, the combination of a housing provided near its base with an inlet for room air and provided in its upper portion with a discharge outlet to the room, a fan within the housing for inducing an air current flow through the housing and into the room, and a biologic window constituting the outer wall of the housing and adapted to admit biologic rays to the interior of the housing to act upon currents of air flowing through the housing and discharging into the room, the housing being provided on its inner side fronting the room with a transparent window to admit light to the room.

3. In an apparatus of the class described, the combination of a housing having a rectangular portion adapted to fit within the upper sash opening of a window and having a body portion adapted to extend inwardly into a room, the body portion having an obliquely disposed upper wall provided with a discharge aperture and having an obliquely disposed lower wall at substantial right angles to the upper wall, said lower wall being afforded by a transparent window, a biologic window constituting the outwardly fronting wall of the housing and adapted to admit biologic rays to the interior of the housing, and a fan within the housing adapted to maintain currents of air through the housing and upwardly through the discharge aperture in the upper wall.

4. In an apparatus of the class described, the combination of a housing having a rectangular portion adapted to fit within the upper sash opening of a window and having a body portion adapted to extend inwardly into a room and provided with a recirculation inlet opening for room air the body portion having an obliquely disposed upper wall provided with a discharge aperture and having an obliquely disposed lower wall at substantial right angles to the upper wall, said lower wall being afforded by a transparent inner window, a biologic window constituting the outwardly fronting wall of the housing and adapted to admit biologic rays to the interior of the housing, and a fan within the housing adapted to maintain currents of air through the housing and upwardly through the discharge aperture in the upper wall, the biologic window being hingedly mounted to permit opening thereof for the ingress of outdoor air and a damper for controlling the ingress of indoor air through the inlet to the housing.

5. In an apparatus of the class described, the combination of a housing having a rectangular portion adapted to fit within the upper sash opening of a window and having a body portion adapted to extend inwardly into a room and provided with a recirculation inlet opening for room air, the body portion having an obliquely disposed upper wall provided with a discharge aperture and having an obliquely disposed lower wall at substantially right angles to the upper wall, said lower wall being afforded by a transparent window, a biologic window constituting the outwardly fronting wall of the housing and adapted to admit biologic rays to the interior of the housing, and a fan within the housing adapted to maintain currents of air through the housing and upwardly through the discharge aperture in the upper wall, the biologic window being hingedly mounted to permit opening thereof for the ingress of outdoor air, and a damper for controlling the ingress of indoor air through the inlet, said damper and said bio. c window being inter-connected to operate in unison to restrict the inflow of room air concurrently with the opening of the biologic window to admit outdoor air, and vice versa.

6. In an apparatus of the class described, the combination of a housing having a rectangular portion adapted to fit within the upper sash opening of a window and having a body portion adapted to extend inwardly into a room, the body portion having an obliquely disposed upper wall provided with a discharge aperture and having an obliquely disposed lower wall at substantially right angles to the upper wall, said lower wall being afforded by a transparent window, a biologic window constituting the outwardly fronting wall of the housing and adapted to admit biologic rays to the interior of the housing, and a fan within the housing adapted to maintain currents of air through the housing and upwardly through the discharge aperture in the upper wall, and an artificial source of biologic rays positioned to direct said rays upon the currents of air flowing through the housing.

7. In an apparatus of the class described, the combination of a housing having a rectangular portion adapted to fit within the upper sash opening of a window and having a body portion adapted to extend inwardly into a room and provided with a recirculation inlet opening for room air, the body portion having an obliquely disposed upper wall provided with a discharge aperture and having an obliquely disposed lower wall at substantially right angles to the upper wall, said lower wall being afforded by a transparent inner window, a biologic window constituting the outwardly fronting wall of the housing and adapted to admit biologic rays to the interior of the housing, and a fan within the housing adapted to maintain currents of air through the housing and upwardly through the discharge aperture in the upper wall, the biologic window being hingedly mounted to permit opening thereof for the ingress of outdoor air and a damper for controlling the ingress of indoor air through the inlet, and an artificial source of biologic rays positioned to direct said rays upon the currents of air flowing through the housing.

8. In an apparatus of the class described, the combination of a housing having a rectangular portion adapted to fit within the upper sash opening of a window and having a body portion adapted to extend inwardly into a room and provided with a recirculation inlet opening for room air, the body portion having an obliquely disposed upper wall provided with a discharge aperture and having an obliquely disposed lower wall at substantially right angles to the upper wall, said lower wall being afforded by a transparent window, a biologic window constituting the outwardly fronting wall of the housing and adapted to admit biologic rays to the interior of the housing, and a fan within the housing adapted to maintain currents of air through the aperture and upwardly through the discharge aperture in the upper wall, the biologic window being hingedly mounted to permit opening thereof for the ingress of outdoor air, and a damper for controlling the ingress of indoor air through the inlet, said damper and said biologic window being inter-connected to operate in unison to restrict the inflow of room air concurrently with the opening of the biologic window to admit outdoor air, and vice versa, and an artificial source of biologic rays positioned to direct said rays upon the currents of air flowing through the housing.

9. In an apparatus of the class described, the combination of a housing having a rectangular portion adapted to fit within the upper sash opening of a window and having a body portion adapted to extend inwardly into a room, the body portion having an obliquely disposed upper wall provided with a discharge aperture, and having an obliquely disposed lower wall at substantially right angles to the upper wall, said lower wall being afforded by a transparent window, a biologic window constituting the outwardly fronting wall of the housing and adapted to admit biologic rays to the interior of the housing, and a fan within the housing adapted to maintain currents of air through the housing and upwardly through the discharge aperture in the upper wall, and an artificial source of biologic rays positioned to direct said rays upon the currents of air flowing through the housing, and current wires and a thermostat for controlling the source of biologic rays, said thermostat being so disposed as to react to the sun's rays to regulate the source of biologic rays conformably to the heating effect of the sun's rays.

10. In an apparatus of the class described, the combination of a housing having a rectangular portion adapted to fit within the upper sash opening of a window and having a body portion adapted to extend inwardly into a room and provided with a recirculation inlet opening for room air, the body portion having an obliquely disposed upper wall provided with a discharge aperture and having an obliquely disposed lower wall at substantially right angles to the upper wall, said lower wall being afforded by a transparent inner window, a biologic window constituting the outwardly fronting wall of the housing and adapted to admit biologic rays to the interior of the housing, and a fan within the housing adapted to maintain currents of air through the housing and upwardly through the discharge aperture in the upper wall, the biologic window being hingedly mounted to permit opening thereof for the ingress of outdoor and and a damper for controlling the ingress of indoor air through the inlet, and an artificial source of biologic rays positioned to direct said rays upon the currents of air flowing through the housing, and current wires and a thermostat for controlling the source of biologic rays, said thermostat being so disposed as to react to the sun's rays to regulate the source of biologic rays conformably to the heating effect of the sun's rays.

11. The method of treating air of a room comprising circulating a portion of the room air through a confined space and back to the room, and exposing the air in that space to biologic sun rays which are passed through a thin medium impervious to air.

12. The method of treating air of a room comprising circulating a portion of the room air through a confined space and back to the room, and exposing the air in that space to biologic sun rays which are passed through a thin medium impervious to air, said confined space being relatively shallow and lying closely adjacent said medium.

13. The method of treating air of a room comprising circulating a portion of the room air through a confined space and back to the room, and exposing the air in that space to biologic sun rays which are passed through a thin medium impervious to air, and directing additional artificially produced biologic rays to said space.

14. The method of treating air of a room comprising circulating a portion of the room air through a confined space and back to the room, and exposing the air in that space to biologic sun rays which are passed through a thin medium impervious to air, said confined space being relatively shallow and lying closely adjacent said medium, and directing additional artificially produced biologic rays to said space.

15. The method of treating air of a room comprising circulating a portion of the room air through a confined space and back to the room, and exposing the air in that space to biologic sun rays which are passed through a thin medium impervious to air, said sun rays entering the room after passing through said space.

16. The method of treating air of a room comprising circulating a portion of the room air through a confined space and back to the room, and exposing the air in that space to biologic sun rays which are passed through a thin medium impervious to air, said sun rays entering the room after passing through said space, the circulating means being located in said confined space.

WILFRED SHURTLEFF.